(12) United States Patent
Han

(10) Patent No.: US 6,327,005 B1
(45) Date of Patent: Dec. 4, 2001

(54) DISPLAY DEVICE AND METHOD IN DIGITAL TV

(75) Inventor: Dongil Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/197,581

(22) Filed: Nov. 23, 1998

(30) Foreign Application Priority Data

Nov. 28, 1997 (KR) .................................. 97/63832

(51) Int. Cl.[7] .................. H04N 9/64; H04N 9/67
(52) U.S. Cl. .................. 348/714; 348/659; 348/660; 348/662; 345/150; 345/199
(58) Field of Search .................. 348/659, 660, 348/662, 714; 345/150, 199; H04N 9/67, 9/64

(56) References Cited

U.S. PATENT DOCUMENTS

| 5,565,931 | * | 10/1996 | Girod | 348/660 |
| 5,838,389 | * | 11/1998 | Mical et al. | 348/650 |
| 5,909,254 | * | 6/1999 | Feig et al. | 348/660 |
| 5,936,683 | * | 8/1999 | Lin | 348/659 |
| 5,963,263 | * | 10/1999 | Shyu | 345/199 |
| 6,052,157 | * | 4/2000 | Weihs | 348/659 |
| 6,075,514 | * | 6/2000 | Ryan | 345/199 |

* cited by examiner

Primary Examiner—Reinhard J. Eisenzopf
Assistant Examiner—Brian P. Yenke

(57) ABSTRACT

A digital TV display device and method is disclosed including a display control unit providing selection signals, a look-up table unit having at least two look-up tables wherein at least one of the look-up tables is operative in a read mode and the other is operative in a write mode in response to the selection signals, and a look-up table selection unit forwarding a data read from the at least one look-up table operative in the read mode in response to the selection signals for displaying.

9 Claims, 6 Drawing Sheets

| | lutw_en | lut_sel | lutw_R | lutw_G | lutw_B |
|---|---|---|---|---|---|

DISPLAY DEVICE AND METHOD IN DIGITAL TV

BACKGROUND OF THE INVENTION

1. Field of the Invention

The present invention relates to a display device and method in a digital TV.

2. Discussion of the Related Art

Generally, the display processor of a digital TV receives a decoded Moving Picture Expert Group 2 (MPEG2) video data and provides viewers a variety of image choices through functions such as multiple picture, zoom, on-screen display, color coordinate converting, look-up table (LUT), and the like. Particularly, the LUT has color tables for Red (R), Green (G), Blue (B) and can convert an input signal into an output signal of a different format. For example, the LUT can output the input signal in the format received, invert and output the input signal, or output a reduce number of input signal levels, thereby allowing a variety forms of display. The LUT can also elevate the signal level of the received video signal to brighten the signal if the video signal is too dark, or adjust the signal levels of the RGB color signals to correct the white balance.

To provide the above functions, the LUT processes the input signals in parallel for a faster rate of signal processing. However, a parallel signal processing requires a data bus over 8 bits as well as addresses and control signals ranging 10~20 bits each. Thus, the LUT for parallel signal processing approximately requires input/output pins over 30 bits, resulting in a complicated hardware and economical inefficiency.

SUMMARY OF THE INVENTION

Accordingly, an object of the present invention is to solve at least the problems and disadvantages of the related art.

An object of the present invention is to reduce the necessary hardware in the display device and method of a digital TV.

Another object of the present invention is to provide a display device and method of a digital TV with an improved real time operation speed.

A further object of the present invention is to provide a display device and method of a digital TV which can consistently maintain a display quality.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the display device and method in a digital TV employs at least two LUTs, wherein one is operative in a read mode and the other is operative in a write mode. By utilizing at least two LUTs, data can be efficiently converted to allow a stable real time display of the data in the LUT.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Figure 1A:
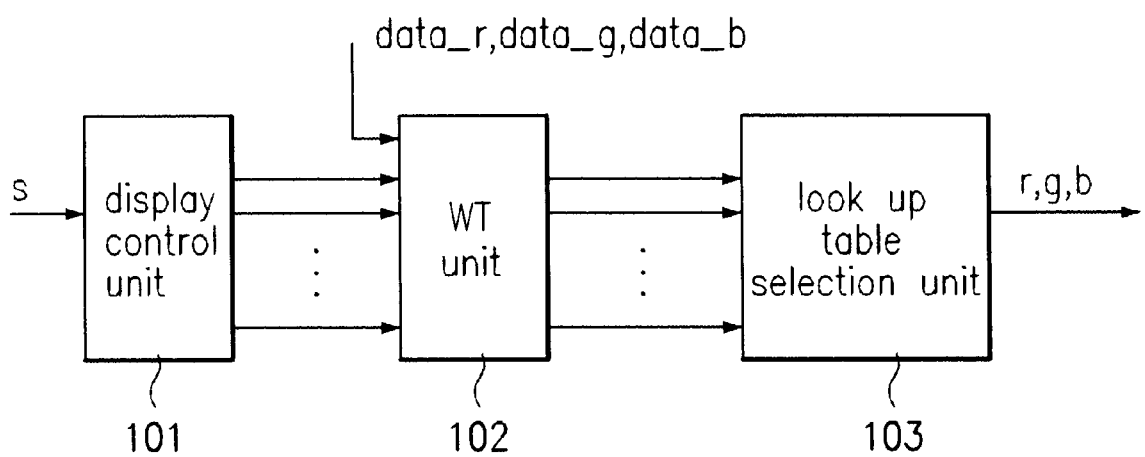
FIGS. 1A and 1B are block diagrams showing a digital TV display according to the present invention.
Figure 1B:
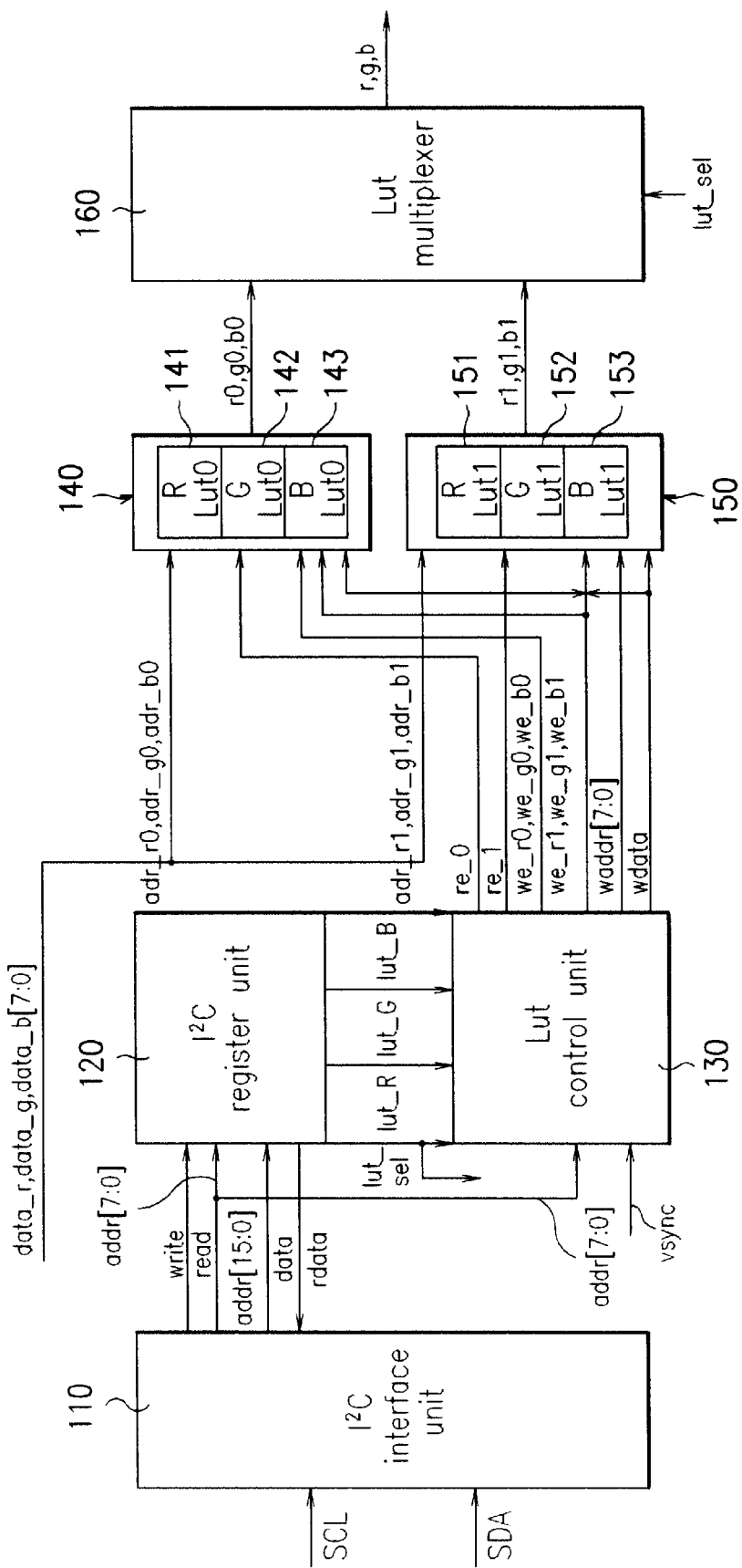

Reference will now be made in detail to the preferred embodiments of the present invention, examples of which are illustrated in the accompanying drawings. FIG. 1A shows a general block diagram of a digital TV display according to the present invention including a display control unit 101, a plurality of look up tables 102, and a look up table selection unit 103. FIG. 1B shows a preferred embodiment of the digital TV display according to the present invention using two look up tables.

Particularly, the digital TV includes an I$^2$C interface unit 110, a first LUT 140, a second LUT 150, an I$^2$C register unit 120, an LUT control unit 130, and an LUT multiplexer 160. The I$^2$C interface unit 110 receives and analyzes a serial clock (SCL) and a serial data (SDA), and provides control signals according to the results of the analysis. The first LUT 140 and the second LUT 150 have RGB tables 141–143 and 151–153 respectively. When one LUT is operative in a read mode, the other LUT is operative in a write mode. The I$^2$C register unit 120 outputs a selection signal lut_sel selecting an LUT from the first and second LUTs 140, 150 in response to the control signal and the address from the I$^2$C interface unit 110. The I$^2$C register unit 120 also outputs the selection signals lutw_R, lutw_G, lutw_B for selecting the RGB tables which will be used within the selected LUT. The LUT control unit 130 regulates the first and second LUTs 140, 150 using the data provided by the I$^2$C register unit 120. The LUT multiplexer 160 selects one output from either the first or second LUTs 140, 150 in response to the selection signal provided by the I$^2$C register unit 120. The detailed operations of the digital TV display will be explained with reference to FIGS. 2–6.

The serial data is synchronous to the serial clock signal SCL, and provides a LUT selection signal and a register address of the LUT. The I$^2$C interface unit 110 receives I$^2$C bus signals SCL and SDA, and either receives or transmits the data. After analyzing the SCL signal and the serial data SDA, the I$^2$C interface unit 110 outputs data to different registers in the I$^2$C register unit 120 and outputs other required signals, such as a write signal, a read signal, an address signal (addr[15:0]), and data rdata.

Particularly, a 16 bit address addr[15:0] output from the I$^2$C interface unit 110 is separated into a backward 8 bit address addr[7:0] and forward 8 bit address addr[7:0]. The backward 8 bit address addr[7:0] is used as an address bus for selecting the LUTs 140, 150, and the forward 8 bit address addr[7:0] is used as an address bus for selecting the different registers in the I$^2$C register unit 120. Both the backward and forward 8 bit addresses are programmable in the I$^2$C interface unit 110, and the backward 8 bit address addr[7:0] are operative in an incremental mode of the I$^2$C bus. Accordingly, the data for either the first or second LUTs 140, 150 can be written on a desired LUT within a comparatively short time period.

An 8 bit video data allows access by the I$^2$C register unit 120 to one of either the first or second LUT 140, 150 using the backward 8 bit address addr[7:0]. When the registers of the I²C register unit 120 utilizing the 8 bit video data access one of the LUT, the addresses of the registers can be assigned to one of six tables. Particularly, the register addresses can be assigned to the tables 141–143 of the first LUT 140 or to the tables 151–153 of the second LUT 150. The separated RGB tables of the LUTs 140, 150 allow a convenient addressing of the LUT.

Access to other portions of the LUTs 140, 150 can be made using the incremental mode of the I²C bus. When the signal lutw_en is in "1" state, the lutw_en is turned off and data from the I²C bus does not affect the LUTs 140, 150. When the signal lutw_en "0" is in a turned on state at "0", the LUTs 140, 150 may be accessed through the incremental mode of the I²C bus.

Figures 2, 3:
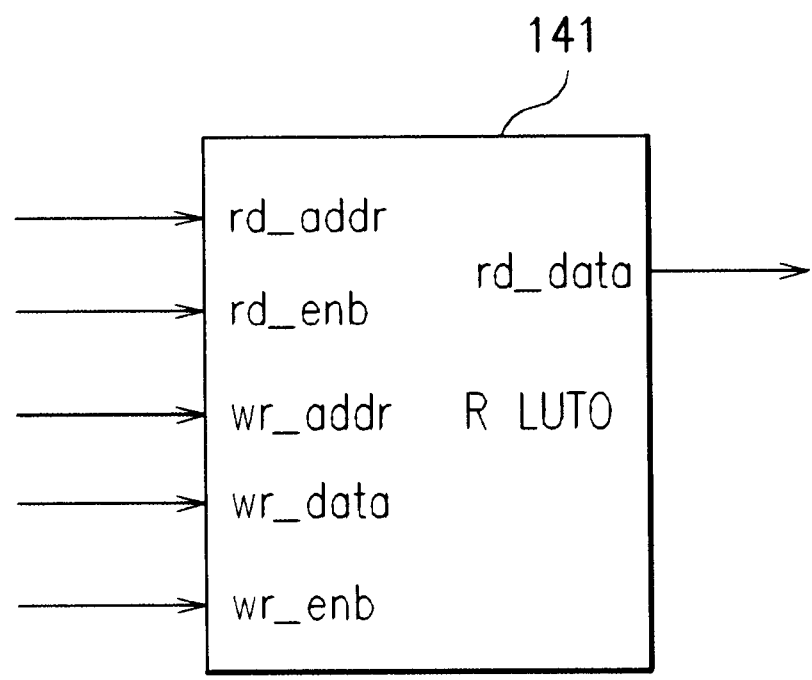
FIG. 2 illustrates the register signals for a look-up table.
FIG. 3 illustrates the input/output signals for the red color table of FIG. 1.

Referring to FIG. 2, the lutw_en signal denotes whether either one of the LUT is being used. The signal lut_sel selects one LUT from the first LUT 140 or the second LUT 150. When the signal lut_sel is in the "0" state, the video data is forwarded to the appropriate address of the first LUT 140. The first LUT 140 outputs a converted data, while the second LUT 150 writes the data. When the signal lut_sel is in the "1" state, the first LUT 140 writes the data while the video data is forwarded to the appropriate address of the second LUT 150. The second LUT 150 outputs a converted data.

As discussed above, in response to the lut_sel signal, one of the first or second LUTs 140, 150 is selected as a look-up table to write data thereon. Once the LUT is selected, the tables 141–143 or the tables 151–153 of the LUT in the writing mode is selected for actual writing of the data according to the signals lutw_R, lutw_G and lutw_B. For example, if different data is to be written on the tables 141–143 of the first LUT 140, only one of the signals lutw_R, lutw_G and lutw_B for selecting the respective tables is allowed in the "0" state. Afterwards, the data can be written on the selected table through the incremental mode of the I²C bus and can be converted within the selected tables. By allowing one signal at a time to be in the "0", the different data can be written and converted in each of the appropriate table.

However, the data to be written on the three tables 141–143 or 151–153 of the first and second LUTs is often identical. In such case, all three signals lutw_R, lutw_G, lutw_B are allowed to be in the "0" mode and the data is written through an incremental mode of the I²C bus. Accordingly, the data is converted in the tables 141–143 or 151–153 with a single access which reduces the processing time period to third. Nonetheless, writing the data on a LUT through the I²C bus requires much time. Even with burst mode of the incremental addressing mode, more than 15 ms is required. Moreover, because of the processing time period, the data cannot be fully written to all portions of the LUT during a video vertical synchronizing time interval. However, writing the data on the LUT outside the time interval of the vertical synchronization affects the display causing a brief moment of abnormality in the display.

Utilizing two sets of look-up tables for each of R, G and B prevents display abnormalities from occurring. When one look-up table is operative in a read mode, the other look-up table is operative in a write mode. The write and read modes of operations for the look-up tables will be explained below with examples.

Figure 4:
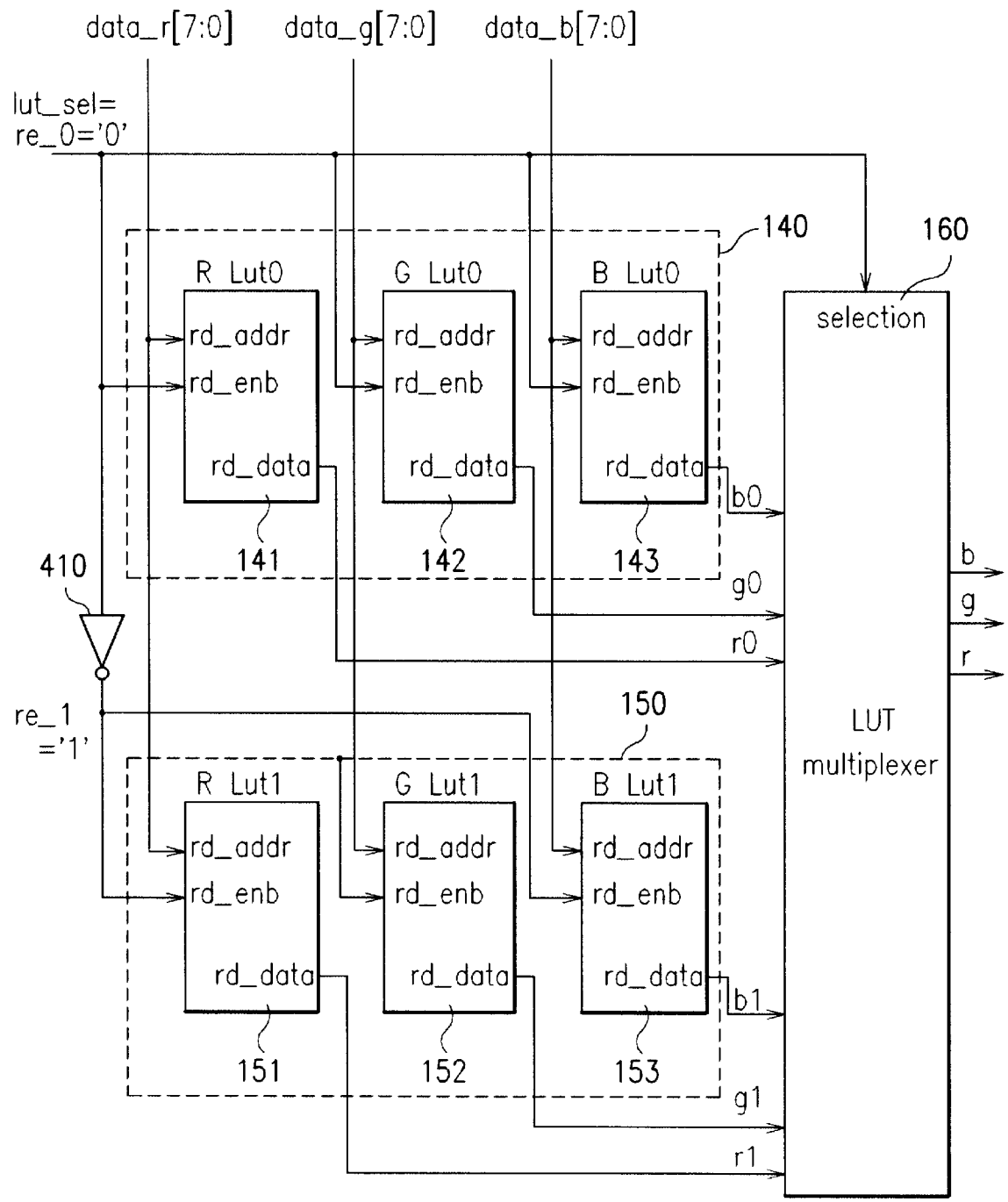
FIG. 4 illustrates the digital TV display during a read operation mode.

Referring to FIG. 3, each of the first and second LUTs 140, 150 has independent ports for inputting/outputting a read enable signal rd_enb, a read address signal rd_addr, a read data signal rd_data, a write enable signal wr_enb, a write address signal wr_addr, and a write data address wr_data. FIG. 4 shows an example of the first LUT 140 in the reading mode. The LUT control unit 130 outputs a read enable signal rd_enb in the "0" mode to the first LUT 140, i.e., a signal re_0 to an input port rd_enb of each tables R Lut0, G Lut0, and B Lut0. The read enable signal rd_enb "0" is also used by the LUT multiplexer 160 as a signal for selecting a LUT. The tables R Lut0, G Lut0 and B Lut0 receives the data data_r[7:0], data_g[7:0] and data_b[7:0] respectively in the appropriate addresses rd_addr and converts the data. The converted data is output to the LUT multiplexer 160 as a read data rd_data. Currently, the read enable signal rd_enb is switched from "0" to "1" mode through an inverter 410 and output to the tables R Lut1, G Lut1, and B Lut1 of the second LUT 150. Accordingly, the second LUT 150 is not enabled to operate in the read mode.

Figure 5:
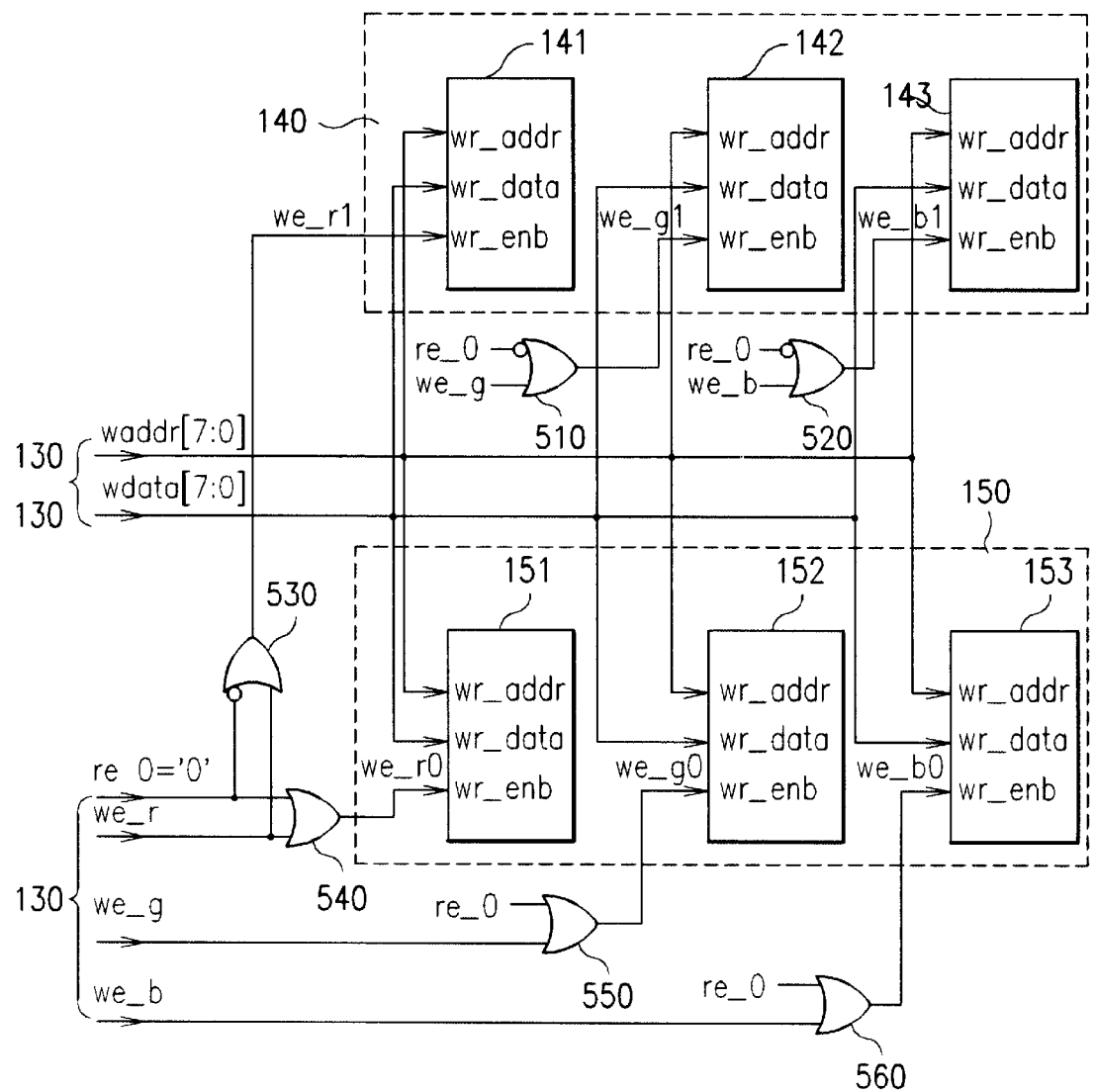
FIG. 5 illustrates the digital TV display during a write operation mode.
Figure 6A:
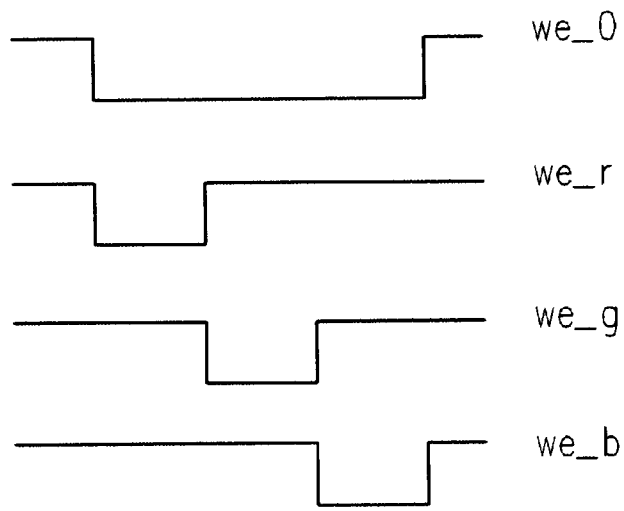
FIGS. 6A and 6B illustrate time frames for the write enable signals.
Figure 6B:
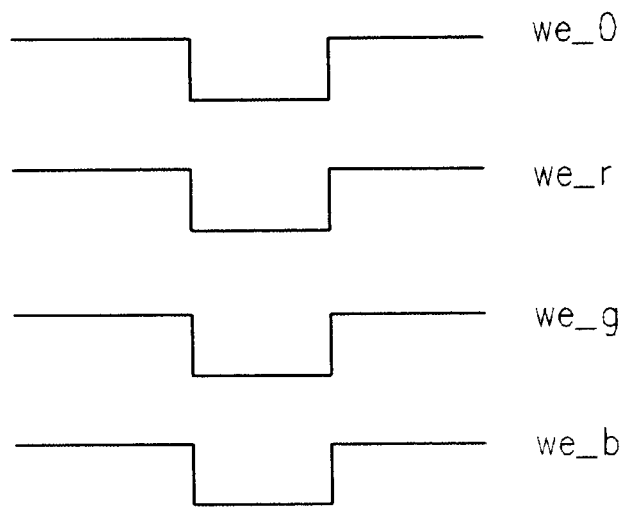

FIG. 5 shows the second LUT 150 in a write mode of operation "0" while the first LUT 140 is in the read mode. As the read enable signal rd_enb "0" to allowed the first LUT 140 to operate in the read mode, a write enable signal wr_enb "0" also allows a LUT to operate in the write mode. Accordingly, the write enable signal wr_enb to the first LUT 140 becomes "1" and the write enable signal wr_enb to the second LUT 150 becomes "0", causing the first LUT 140 to operate in a read mode and the second LUT 150 operate in a write mode. FIG. 6A shows the time frames of the write enable signals wr_enb by which different data is written on the three RGB color tables 151–153 respectively, and FIG. 6B shows the time frames of the write enable signals rd_enb by which identical data is written on the three RGB color tables.

In the write operational mode, the LUT control unit 130 forwards the write address waddr[7:0] and write data wdata [7:0] to the write address signal ports wr_addr and write data wr_data ports of the first and second LUTs 140, 150 respectively. Referring to FIG. 5, the write enable signal port wr_enb of the red color table 141 in the first LUT 140 receives an inverted read enable signal re0 and the red color write signal we_r through an OR gate 530. The write enable signal port wr_enb of the green color table 142 in the first LUT 140 receives an inverted read enable signal re0 and the green color write signal we_g through an OR gate 510. The write enable signal port wr_enb of the blue color table 143 in the first LUT 140 receives an inverted read enable signal re0 and the blue color write signal we_b through an OR gate 520. Since the RGB tables 141–143 of the first LUT 140 are provided with a logic signal "1", the first LUT 140 is not enabled for the write mode of operation.

The write enable signal port wr_enb of the red color table 151 in the second LUT 150 receives a read enable signal re0 and the red color write signal we_r through an OR gate 540. The write enable signal port wr_enb of the green color table 152 in the second LUT 150 receives a read enable signal re0 and the green color write signal we_g through an OR gate 550. The write enable signal port wr_enb of the blue color table 151 in the second LUT 150 receives a read enable signal re0 and the blue color write signal we_b through an OR gate 560. Since the RGB tables 151–153 of the second LUT 150 are provided with a logic signal "0", the second LUT 150 is enabled for the write mode of operation.

Therefore, the 8 bit write data wdata[7:0] is written the enabled RGB tables 151–153 of the second LUT 150 in the appropriate 8 bit write address designated by the address signal waddr[7:0]. Moreover, the LUT control unit 130 controls the read and write operational modes of the LUTs 140, 150 and each of the corresponding color tables by means of the address waddr[7:0]; the data wdata, i.e. data_r[7:0], data_g[7:0], data_b[7:0]; the read enable signals re_ and re_1; and the write enable signals we_r0, we_g0, we_b0, we_r1, we_g1, and we_b1. The LUT control unit 130 controls the color tables by timely outputting the appropriate signals and data to the LUTs 140, 150. Also, if a write data is being written on one of the first or second LUTs 140, 150 while the display power is on or reset, the LUT control unit 130 controls LUT in the writing mode to output the data in the format received and switches the operating mode to control the LUT in the reading mode. Accordingly, images can be displayed without abnormalities even right after switching the power on or after a resetting of the display.

In sum, the I²C bus of the digital TV display in the related art for inputting/outputting data to/from a look-up table could not quickly process the data. However, the digital TV display according to the present invention uses more than two sets of look-up tables to quickly and efficiently process the data. Accordingly, the data on one look-up table can be changed while leaving the other look-up tables in a read operational mode, by changing the role of the other look-up table or tables. Thus, the data on the look-up table can be changed without affecting the display. Finally, although the preferred embodiment solves the problem of the processing speed using two look-up tables 140 and 150, more than two look-up tables may be used within the limitation of size or cost of the device.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A display in a digital TV receiver comprising:
   a display control unit outputting selection control signals in response to received serial clock signal and serial data;
   an LUT unit having at least two look-up tables and receiving video data and said selection control signals, wherein at least one look-up table is operative in a read mode while at least one look-up table is operative in a write mode for the received video data in response to said selection control signals;
   a look-up table selection unit receiving at least one of said selection control signals and outputting the video data read from said at least one look-up table operative in the read mode in response to at least one of said selection signals for displaying;
   an interface unit receiving and analyzing the serial clock signal and the serial date, said interface unit outputting at least one control signal and at least one address signal according to the results of the analysis;
   a signal generating unit receiving said at least one control signal and at least one address signal, and outputting said selection control signals;
   a register unit receiving said at least one control signal and at least one address signal, said register unit generating outputting selection signals in response to said at least one control signal and said at least one address signal from the interface unit; and
   a look-up table control unit receiving the selection signals and outputting said selection control signals to said look-up table unit using the selection signals from the register unit, wherein the selection control signals controls the read and write mode operations of said look-up table unit.

2. A display of claim 1, wherein each of said look-up tables includes a plurality of color tables, and at least one of the plurality of color tables in each of said look-up tables is selected to operate either in the write mode or in the read mode in response to said selection control signals.

3. A display of claim 2, wherein the plurality of color tables include red color table, green color table, and blue color table.

4. A display of claim 1, wherein the look-up table selection unit includes a multiplexer.

5. A display of claim 1, wherein the interface unit, the register unit, and the look-up table control unit are connected by I²C buses.

6. A display in a digital TV receiver comprising:
   an interface unit receiving and analyzing a serial clock signal and a serial data, said interface unit outputting at least one control signal and at least one address signal according to the results of the analysis;
   a register unit generating a first and second selection signals in response to said at least one control signal and said at least one address signal from the interface unit,
   a first look-up table having a plurality of color tables, said first look-up table operating either in a read mode or in a write mode in response to said first selection signal, wherein at least one of the color tables is selected in response to said second selection signal to operate in mode corresponding to the mode of the first look-up table;
   a second look-up table having a plurality of color tables, said second look-up table operating in a mode opposite to the mode of the first look-up table in response to said first selection signal, wherein at least one of the color tables is selected in response to said second selection signal to operate in mode corresponding to the mode of the second look-up table;
   a look-up table control unit controlling the read and write mode operations of the first and second look-up tables using said first and second selection signals provided from the register unit; and
   a look-up table selection unit receiving said first selection signal and forwarding data from either the first or second look-up tables operating in the read mode in response to said first selection signal.

7. A display of claim 6, wherein the plurality of color tables in each of the first and second look-up tables include red color table, green color table, and blue color table.

8. A display of claim 6, wherein the look-up table selection unit includes a multiplexer.

9. A display of claim 6, wherein the interface unit, the register unit, and the look-up table unit are connected with I²C buses.

* * * * *